(12) United States Patent
Park et al.

(10) Patent No.: US 9,696,834 B2
(45) Date of Patent: Jul. 4, 2017

(54) TOUCH SCREEN PANEL AND FABRICATING METHOD THEREOF

(71) Applicant: Samsung Display Co., LTD., Yongin-si, Gyeonggi-do (KR)

(72) Inventors: Hee-Woong Park, Yongin-si (KR); Byeong-Kyu Jeon, Yongin-si (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/204,482

(22) Filed: Jul. 7, 2016

(65) Prior Publication Data
US 2016/0320874 A1    Nov. 3, 2016

Related U.S. Application Data

(62) Division of application No. 13/943,697, filed on Jul. 16, 2013, now abandoned.

(30) Foreign Application Priority Data

Feb. 19, 2013   (KR) ........................ 10-2013-0017470

(51) Int. Cl.
*G02F 1/1335*    (2006.01)
*G06F 3/041*    (2006.01)
(Continued)

(52) U.S. Cl.
CPC .............. *G06F 3/041* (2013.01); *G06F 3/044* (2013.01); *G02F 1/13338* (2013.01);
(Continued)

(58) Field of Classification Search
CPC ..... G02F 1/13338; G02F 2001/136231; G02F 2001/13625; G06F 3/03547; G06F 3/041;
(Continued)

(56) References Cited

U.S. PATENT DOCUMENTS

| 8,591,279 B1 | 11/2013 | Cok et al. |
| 8,773,395 B2 | 7/2014 | Cok et al. |

(Continued)

FOREIGN PATENT DOCUMENTS

| KR | 10-2010-0107313 | 10/2010 |
| KR | 10-2010-0124016 | 11/2010 |

*Primary Examiner* — Paisley L Arendt
(74) *Attorney, Agent, or Firm* — Knobbe, Martens, Olson & Bear LLP

(57) ABSTRACT

A method of making a touch screen panel includes providing a substrate assembly and a multi-layered film. The substrate assembly includes a substrate, and first and second sensing electrodes formed over the substrate. The multi-layered film includes a first conductive photosensitive layer, a second conductive photosensitive layer, and an insulation photosensitive layer. The insulation photosensitive layer has a light sensitivity different from that of at least one of the first and second conductive photosensitive layers. The method further includes forming insulators by exposing and developing the insulation photosensitive layer, and forming bridges and insulators by exposing and developing the second conductive photosensitive layer. The substrate assembly and the multi-layered film are assembled to form the touch panel.

14 Claims, 10 Drawing Sheets

(51) Int. Cl.
   *G06F 3/044*     (2006.01)
   *G06F 3/0354*    (2013.01)
   *G02F 1/1333*    (2006.01)

(52) U.S. Cl.
   CPC .................... *G06F 3/03547* (2013.01); *G06F 2203/04103* (2013.01); *G06F 2203/04111* (2013.01)

(58) Field of Classification Search
   CPC .................... G06F 3/044; G06F 3/045; G06F 2203/04112; G06F 2203/04111; G06F 2203/04103
   See application file for complete search history.

(56) References Cited

U.S. PATENT DOCUMENTS

2010/0245269 A1    9/2010  Jeong et al.
2010/0265193 A1*  10/2010  Kung ...................... G06F 3/044
                                                          345/173
2013/0154961 A1*   6/2013  Wu ......................... G06F 3/041
                                                          345/173

* cited by examiner

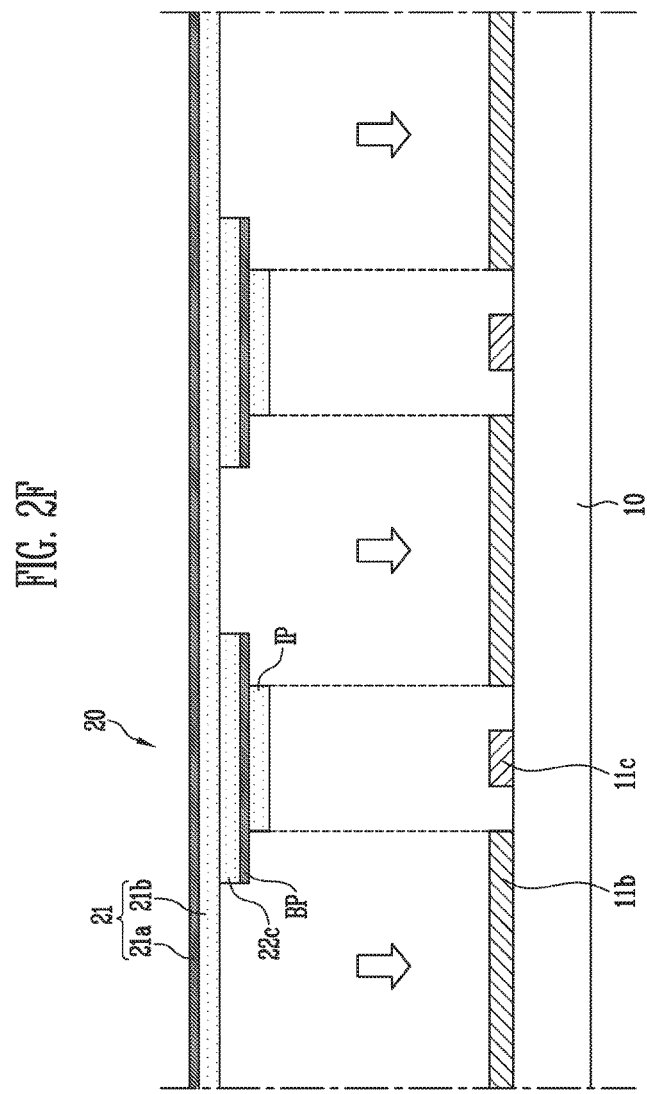

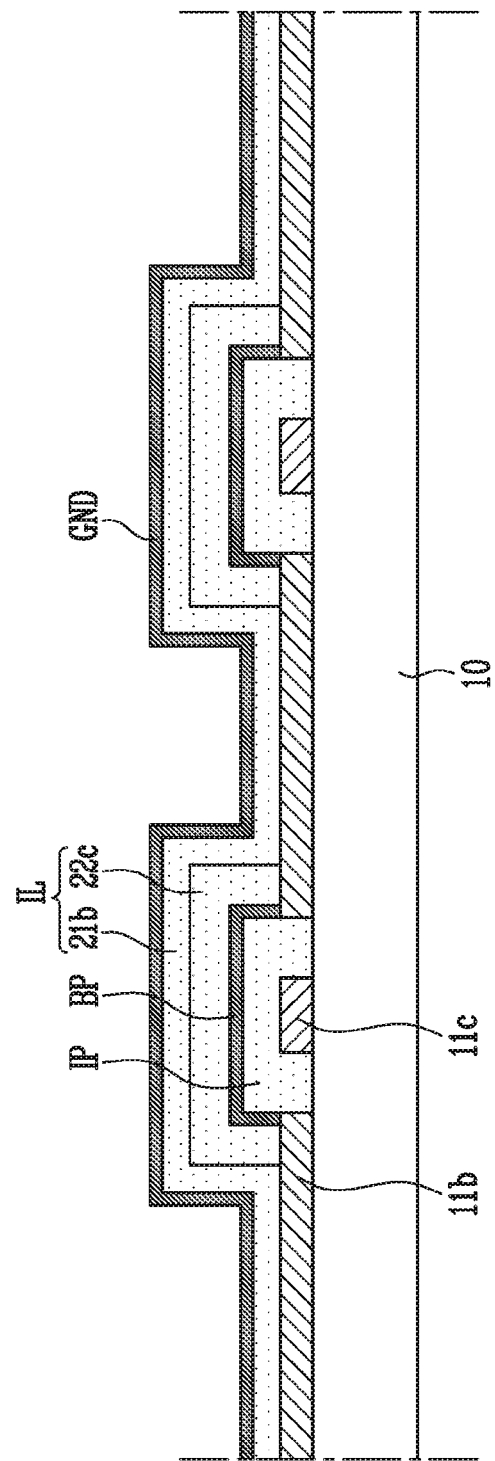

TOUCH SCREEN PANEL AND FABRICATING METHOD THEREOF

RELATED APPLICATIONS

This application is a divisional of U.S. patent application Ser. No. 13/943,697, filed on Jul. 16, 2013, which claims priority to and the benefit of Korean Patent Application No. 10-2013-0017470, filed on Feb. 19, 2013, in the Korean Intellectual Property Office, the entire content of which is incorporated herein by reference.

BACKGROUND

Field

The present disclosure relates to a touch screen panel and a fabricating method thereof.

Description of the Related Art

A touch screen panel is an input device capable of inputting a user's instruction by selecting instruction contents displayed on a screen of an image display device, or the like, with a human hand or an object.

To this end, the touch screen panel is provided on a front face of the image display device to convert a contact position that the human hand or the object directly contacts into an electric signal. Therefore, an instruction content selected at the contact position is recognized as an input signal.

The touch screen panel as described above is generally fabricated by attaching on an outer surface of the image display device such as a liquid crystal display (LCD) and an organic light emitting diode (OLED) display. Therefore, the touch screen panel having a high transparency and a thin thickness has been demanded.

In addition, recently, a flexible image display device has been developed. In accordance with the trend, the touch screen panel attached on the flexible image display panel has also been demanded.

Additionally, the touch screen panel includes the ground layer formed on one surface thereof, whereby the noise of a display image generated at time of driving the touch sensor may be reduced.

However, when the ground layer is additionally formed, the entire thickness of the touch screen panel is increased, such that the flexible characteristics may be deteriorated.

SUMMARY OF CERTAIN INVENTIVE ASPECTS

An aspect of the present invention provides a touch screen panel and a fabricating method thereof capable of improving display quality by forming a ground layer and minimizing an increase in thickness of the product.

One embodiment of the present invention provides a method of making a touch screen panel, including: providing a substrate assembly comprising a substrate, first sensing electrodes formed over the substrate and arranged in rows extending along a first direction, and second sensing electrodes formed over the substrate and arranged in columns extending along a second direction intersecting with the first direction, the first sensing electrodes arranged in each of the rows being connected to each other; providing a multi-layered film comprising a first conductive photosensitive layer, a second conductive photosensitive layer, and an insulation photosensitive layer having a light sensitivity different from that of at least one of the first and second conductive photosensitive layers; forming insulators by exposing and developing the insulation photosensitive layer; forming bridges and insulators by exposing and developing the second conductive photosensitive layer; and assembling the substrate assembly and the multi-layered film multi-layered film comprising the insulators and the bridges such that each bridge connects two immediately neighboring second sensing electrodes and each insulator insulates one of the bridges and the first sensing electrodes.

The second conductive photosensitive layer has a light sensitivity substantially equal to or higher than that of the first conduct photosensitive layer, and the insulation photosensitive layer may have the light sensitivity higher than that of the second conduct photosensitive layer.

The first conductive photosensitive layer, the second conductive photosensitive layer, and the insulation photosensitive layer may have the amount of exposure and development condition different form each other in the exposure/development processes.

Each of the first and second conductive photosensitive layers may comprise a photosensitive film and a nano wire conductive film.

The nano wire conductive film may comprise silver nano wires.

The multi-layered film may comprise a stack of the first silver nano wire conductive film, the first photosensitive film, the second photosensitive film, the silver nano wire conductive film, and the insulation photosensitive layer which are sequentially stacked.

The insulators and the bridges have substantially the same width, but the bridges have a length longer than that of the insulators.

The method may further include aligning the substrate with the multi-layered film such that the insulators and bridges are overlapped with connectors connecting the first sensing electrodes.

The method may further include exposing of the first conductive photosensitive layer.

The method may further include connecting the first conductive photosensitive layer to a ground unit.

The second sensing electrodes may be formed over the substrate to be disposed between the first sensing electrodes and to be separate from each other.

The method may further include forming outer wirings over the substrate to connect the first sensing electrodes and the second sensing electrodes to an external driving circuit.

The substrate assembly is divided into an active area and a non-active area which is disposed at an outer portion of the active area when viewed in a thickness direction of the substrate, and the first and second sensing electrodes may be formed in the active area and the outer wirings may be formed in the non-active area.

The substrate may be made of at least one material selected from the group consisting of polyethylene terephthalate (PET), polycarbonate (PC), acryl, poly methyl methacrylate (PMMA), a triacetylcellulose (TAC) film, polyethersulfone (PES), and a polyimide (PI) film.

Another embodiment of the present invention provides a method of making a touch screen panel, including: providing a substrate assembly comprising a substrate and first sensing electrodes formed over the substrate and extending along a first direction; providing a multi-layered film comprising a first conductive photosensitive layer and a second conductive photosensitive layer, the first conductive photosensitive layer having a light sensitivity different from that of the second conductive photosensitive layer; forming second sensing electrodes extending along a second direction by exposing and developing the second conductive photosensitive layer; and laminating the substrate assembly and a multi-layered film comprising the second sensing electrodes such that the second direction intersects the first direction when viewed in a thickness direction of the substrate.

The second conductive photosensitive layer may have a light sensitivity higher than that of the first conductive photosensitive layer.

The forming of the multi-layered film may further comprise an insulation photosensitive layer between the first and second conductive photosensitive layers.

The insulation photosensitive layer may have the light sensitivity substantially equal to or higher than that of the first conductive photosensitive layer and have the light sensitivity lower than that of the second conductive photosensitive layer.

The first conductive photosensitive layer, the second conductive photosensitive layer, and the insulation photosensitive layer may have the amount of exposure and development condition different form each other in the exposure/development processes.

Each of the first and second conductive photosensitive layers may comprise a photosensitive film and a nano wire conductive film.

The nano wire conductive film may comprise silver nano wires.

The multi-layered film may comprises a stack of the first silver nano wire conductive film, the first photosensitive film, the insulation photosensitive layer, the second silver nano wire conductive film, and the second photosensitive film which are sequentially stacked.

The method may further comprise exposing the first conductive photosensitive layer.

The method may further comprise connecting the first conductive photosensitive layer to a ground unit.

Still another embodiment of the present invention provides a touch screen panel including: a substrate; first sensing electrodes formed over the substrate and arranged in rows extending along a first direction and second sensing electrodes formed over the substrate and arranged in columns extending along a second direction intersecting with the first direction, the first sensing electrodes arranged in each of the rows being connected to each other; bridges electrically connecting two immediately neighboring second sensing electrodes arranged along the second direction; insulators overlapped interposed between the bridges and connectors electrically connecting the first sensing electrodes; and a ground layer covering the first and second sensing electrodes and the bridges, wherein the insulators and the bridges are formed by exposing and developing an insulation photosensitive layer and a second conductive photosensitive layer of a multi-layered film comprising a first conductive photosensitive layer, the second conductive photosensitive layer, and the insulation photosensitive layer having a light sensitivity different from that of at least one of the first and second conductive photosensitive layers.

The second conductive photosensitive layer may have a light sensitivity substantially equal to or higher than that of the first conduct photosensitive layer, and the insulation photosensitive layer may have the light sensitivity higher than that of the second conduct photosensitive layer.

Each of the first and second conductive photosensitive layers may comprise a photosensitive film and a nano wire conductive film.

The multi-layered film may comprise a stack of the first silver nano wire conductive film, the first photosensitive film, the second photosensitive film, the second silver nano wire conductive film, and the insulation photosensitive layer which are sequentially stacked.

The first conductive photosensitive layer may be configured to form the ground layer.

BRIEF DESCRIPTION OF THE DRAWINGS

The accompanying drawings, together with the specification, illustrate exemplary embodiments of the present invention, and, together with the description, serve to explain the principles of the present invention.

FIGS. 2A to 2G are views describing a fabricating method of the touch screen panel.

DETAILED DESCRIPTION OF CERTAIN INVENTIVE EMBODIMENTS

Figure 1A:
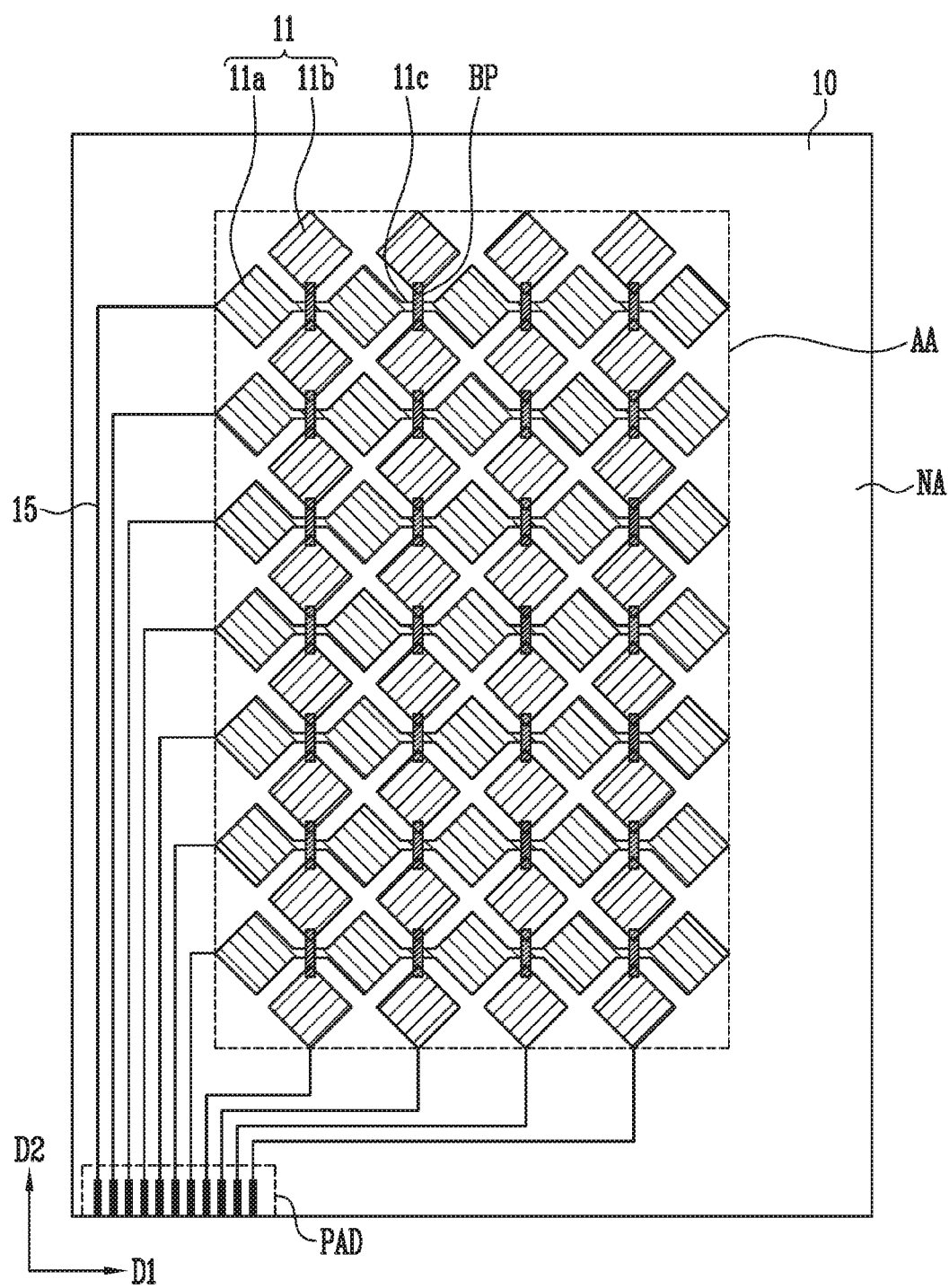
FIG. 1A is a plan view schematically showing an example of a touch screen panel.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter, exemplary embodiments of the present invention will be described in detail with reference to the accompanying drawings.

Figure 1B:
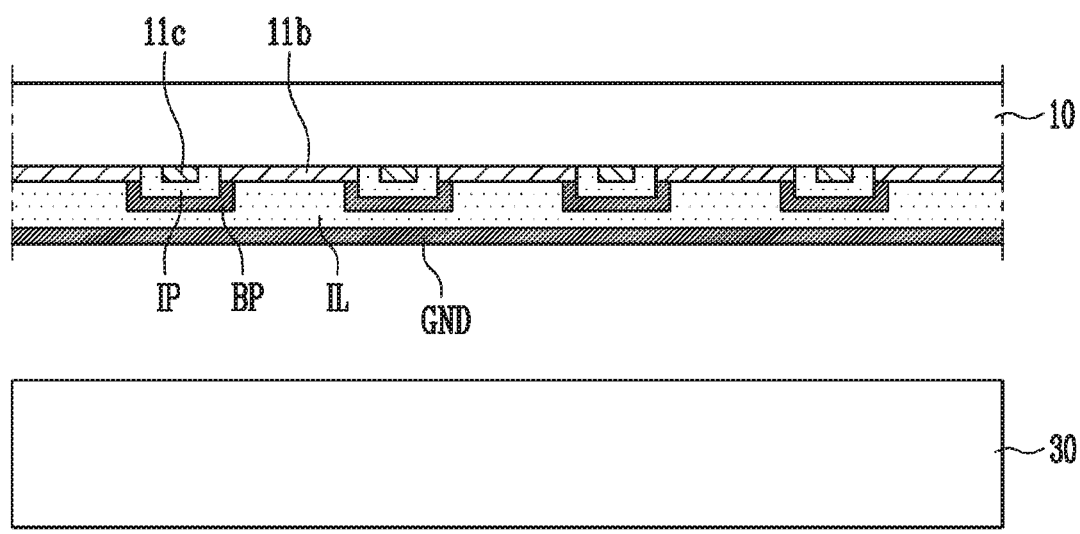
FIG. 1B is a cross-sectional view taken along a second direction shown in FIG. 1A.

FIG. 1A is a plan view schematically showing an example of a touch screen panel and FIG. 1B is a cross-sectional view taken along a second direction the touch screen panel shown in FIG. 1A.

Referring to FIGS. 1A and 1B, the touch screen panel according to the exemplary embodiment of the present invention is configured to include a substrate 10, sensing electrodes 11, connection patters 11c, insulators IP, bridges BP, outer wirings 15, insulation film IL, and ground layer (GND).

The substrate 10, which is a window substrate to be provided on a front surface of the touch screen panel, overlaps with an image display area of a display unit 30 disposed in a lower end and may be divided into an active area AA capable of receiving touch input by having the sensing electrodes 11 formed on one surface toward the display unit 30 and a non-active area NA which is disposed at an outer portion of the active area AA and outer wirings 15 are formed therein. The substrate is divided into the active area AA and the non-active area NA when viewed in a thickness direction of the substrate.

The non-active area NA is a shaded area overlapped with an image non-display area of the display unit 30 and has a form enclosing the active area AA on which the image is displayed.

The substrate 10 has a flexible characteristic and may be formed of a material having characteristics of transparency, heat resistance, and chemical resistance. For example, the substrate 10 may be made of at least one material selected from the group consisting of polyethylene terephthalate (PET), polycarbonate (PC), acryl, poly methyl methacrylate (PMMA), a triacetylcellulose (TAC) film, polyethersulfone (PES), and a polyimide (PI) film.

The sensing electrodes 11 are distributed and disposed in the active area AA on the substrate 10 and include a plurality of first sensing electrodes 11a formed to be arranged in rows and to electrically connect along a first direction D1 and a plurality of second sensing electrodes 11b distributed in columns and disposed between the first sensing electrodes 11a so as not to overlap with the first sensing electrodes 11a when viewed in the thickness direction, and formed so as to electrically connect along a second direction D2 intersecting with the first direction D1.

That is, the first sensing electrodes 11a and the second sensing electrodes 11b are alternately disposed with each other to be connected to different directions from each other. For example, the first sensing electrodes 11a are formed so as to connect along a row direction (a horizontal direction) to be connected to each of the outer wirings 15 row by row, and the second sensing electrodes 11b are formed so as to connect along a column direction (a vertical direction) to be connected to each of the outer wirings 15 column by column. In one embodiment, the row direction is perpendicular to the column direction. In another embodiment, the row direction is not perpendicular to the column direction.

The first sensing electrodes 11a and second sensing electrodes 11b having the same diamond shape may be disposed in the same layer and be formed of a transparent electrode material such as an ITO so that light irradiated from the display unit 30 disposed in the lower portion thereof may be transmitted.

According to another embodiment of the present invention, the sensing electrodes 11 may have a stripe shape, and the material, shape and disposition structure of the sensing electrodes 11 may have variously modified exemplary embodiments.

The connectors 11c connect the first sensing electrodes 11a along the first direction D1 and the bridges BP connect the second sensing electrode 11b along the second direction D2.

More specifically, the connectors 11c are formed as patterns directly connected with the first sensing electrode 11a in the same layer and the bridges BP are formed as patterns separated from the second sensing electrode 11b, however the bridges BP are electrically connected to the second sensing electrodes 11b at upper or lower portion of the second sensing electrodes 11b to thereby connect the second sensing electrodes 11b in a line unit in the second direction D2.

Here, the insulators IP are formed at a portion at which the first sensing electrodes 11a and second sensing electrodes 11b intersect with each other, that is, between the connectors 11c and the bridges BP, to electrically insulate bridges from connectors.

In partial embodiment, the connectors 11c are formed of the transparent electrode material together with the sensing electrodes 11, the bridges BP may be formed of opaque metal material with the low resistance.

In the case in which the connectors 11c are formed of the transparent electrode material, in patterning the transparent electrode material, the first sensing electrodes 11a and the connectors 11c are patterned integrally with each other, thereby making it possible to simplify a manufacturing process.

The bridges BP are formed of the transparent electrode material such as the sensing electrodes 11 and the connectors 11c or the opaque metal material with the low resistance. In this case, a width, a thickness, a length and the like may be controlled so that visualization may be prevented.

In the case in which the bridges BP are formed of the opaque metal material with the row resistance, in forming the outer wirings 15 which is disposed in non-active area NA, the bridges BP are formed simultaneously, thereby making it possible to simplify the manufacturing process. That is, the bridges BP may be formed of the same material as the outer wirings 15 in the same layer.

However, the width is limited so that the visualization may be prevented, therefore, the width of the bridges BP is formed narrower than that of the connectors 11c which are formed of the transparent material.

In another embodiment, the bridges BP may be inclined in a diagonal direction so that the visualization may be more effectively prevented.

The outer wirings 15 are to connect each of the first sensing electrodes 11a and second sensing electrodes 11b to an external driving circuit (not shown) in the line unit along the first direction D1 and second direction D2. For example, the outer wirings 15 are electrically connected to the first and second sensing electrodes 11a and 11b in the row and column units to connect to the external driving circuit (not shown) such as a position detection circuit through a pad unit (PAD).

The outer wirings 15 are disposed in a non-active area at the outer side of the touch screen panel to avoid the active area AA on which an image is displayed, and may be formed of the metal material with the low resistance such as molybdenum Mo, silver Ag, titanium Ti, copper Cu, aluminum Al, molybdenum/aluminum/molybdenum Mo/Al/Mo or the like in addition to the transparent conductive material to be used in order to form the sensing electrodes 11 by a wider selection of material.

The ground layer GND is entirely formed on the active area AA of the touch screen panel to thereby serve to reduce a noise of the display image generated at the time of driving of the sensing electrodes 11.

The ground layer GND is formed of the transparent electrode material and is electrically connected to a ground unit (not shown). In addition, the ground layer GND and the sensing electrodes 11 have the insulation film IL interposed therebetween to insulate both of the conductive films.

As described above, in the case of the touch screen panel in which the ground layer GND is formed in order to increase the display quality, the entire thickness of the touch screen panel is increased, such that the flexible characteristics thereof are deteriorated.

Therefore, the ground layer GND is formed to use the thin film type photosensitive film including the silver nanowire conductive photosensitive layer.

Particularly, the bridges or the sensing electrodes are formed by exposing and developing each layer of the multi-layered film having at least two the silver nanowire conductive photosensitive layers having the light sensitivity different from each other stacked therein, thereby making it possible to improve the flexible characteristics and simplify the fabricating process of the touch screen panel.

As a result, an aspect of the present invention provides the touch screen panel and the fabricating method thereof capable of improving the display quality, the flexible characteristics, and the productivity and minimizing the increase in the thickness of the product.

The fabricating method of the multi photosensitive film or multi-layered film and the touch screen panel using the same will be described with reference to FIGS. 2A to 2E.

FIGS. 2A to 2G are views describing a fabricating method of the touch screen panel.

Figure 2A:
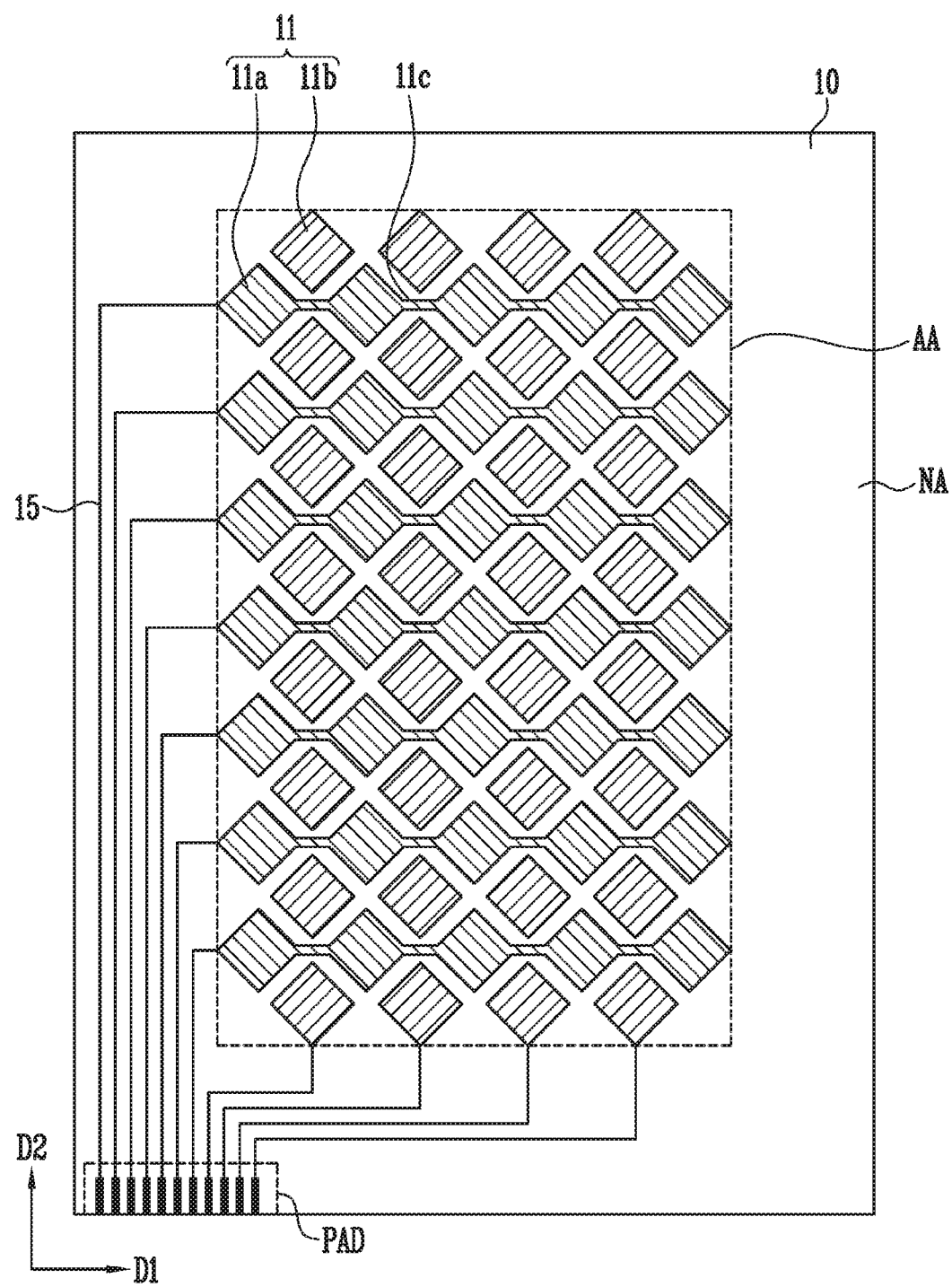

First, referring to FIG. 2A, a first sensing electrodes 11a connected along a first direction D1, a second sensing electrodes 11b arranged along a second direction D2 intersecting with the first direction D2, and connectors 11c which are directly connected with the first sensing electrodes 11a in the same layer are formed on a substrate 10. The substrate 10 and the first and second sensing electrodes 11a and 11b can form a sub-assembly.

In addition, outer wirings 15 for connecting each of the first sensing electrodes 11a and the second sensing electrode 11b with an external driving circuit in the line unit along the first direction D1 and second direction D2 may further form.

However, bridges BP for connecting the second sensing electrodes 11b along the second direction D2 and insulators IP formed between the connectors 11c and bridges BP do not form in this sub-assembly.

In the step shown in FIG. 2A, the insulators IP, the bridges BP, the insulation film IL, and the ground layer GND are not formed, but formed using a multi-layered film in the later steps to be described below.

As described above, the sensing electrodes 11 may be formed of a transparent electrode material such as an ITO thereon so that light may be transmitted. Further, the sensing electrodes 11 may be formed by performing the patterning by a photolithography process and an etching process after the conductive material is deposited on the whole surface of the substrate 10.

Figure 2B:
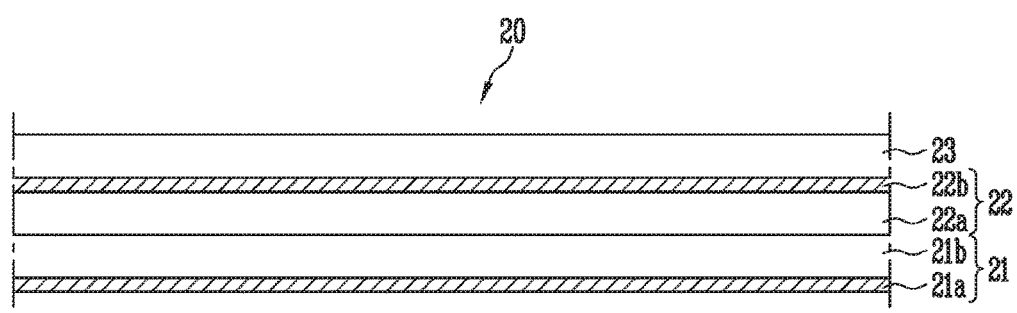

Referring to FIG. 2B, in the multi-layered film 20, a first conductive photosensitive layer 21, a second conductive photosensitive layer 22, and an insulation photosensitive layer 23 having a light sensitivity different from each other are sequentially stacked.

Here, the second conductive photosensitive layer 22 has the light sensitivity higher than that of the first conductive photosensitive layer 21, and the insulation photosensitive layer 23 have a light sensitivity higher than that of the second conductive photosensitive layer 22.

The degree of light sensitivity is relatively classified according to the amount of light irradiation required for hardening of a photosensitive layer at the time of the exposing process, wherein the insulation photosensitive layer 23 having the highest light sensitivity is hardened by a relatively small amount of light irradiation, and the first conductive photosensitive layer 21 having the lowest light sensitivity is hardened by a relatively large amount of light irradiation.

In the embodiment of the present invention, it may be defined that the first conductive photosensitive layer 21 has low sensitivity, the second conductive photosensitive layer 22 has medium sensitivity, and the insulation photosensitive layer 23 has high sensitivity, for the sake of convenience.

Generally, since the photosensitive material used in the photosensitive film, such as a dry film resist and the like, is the insulation material, the conductive material should be mixed in order to provide conductivity.

The first and second photosensitivity layers 21 and 22 having the conductivity may have a photosensitive film and a nano wire conductive film, respectively. In this case, the insulation photosensitive layer 23 is made of a pure photosensitive material that does not include the conductive material.

When considering thinning effect of the multi-layered film 20, it is preferable that the nano wire conductive film is made of silver nano wire AgNW.

In the partial embodiment, in the multi-layered film 20, a first silver nano wire conductive film 21a, the first photosensitive film 21b, the second photosensitive film 22a, a second silver nano wire conductive film 22b, and the insulation photosensitive layer 23 is sequentially stacked.

The stacked structure of the multi-layered film 20 may have various modified examples as needed within the range including at least two of conductive photosensitive layers.

The first photosensitive film 21b is made of the low sensitivity photosensitive material, the second photosensitive film 22a is made of the medium sensitivity photosensitive material, and the insulation photosensitive layer 23 is made of the high sensitivity photosensitive material. The light sensitivity may be decided by the photosensitive material, the mixture ratio, and the like.

In addition, each of the photosensitive layers preferably uses the positive type that the exposed portion may be removed by developing.

Therefore, configuring the multi-layered film 20, each of the first conductive photosensitive layer 21, the second conductive photosensitive layer 22, and the insulation photosensitive layer 23 have the amount of exposure and development conditions in the exposure/development processes.

Figure 2C:
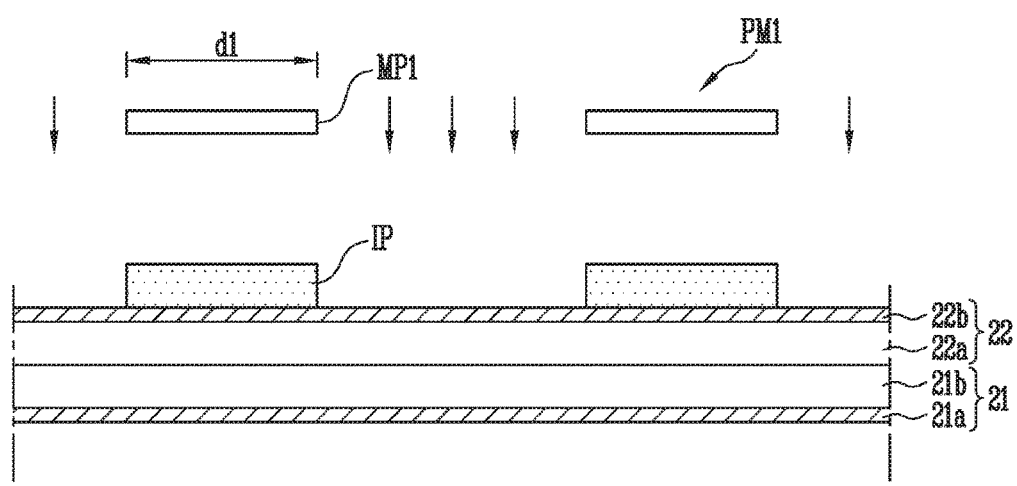

Referring to FIG. 2C, the insulators IP overlapped with crossed portion of first sensing electrodes 11a and second sensing electrodes 11b are formed by exposing and developing the insulation photosensitive layer 23, which is a top layer of the multi-layered film 20.

Specifically, a first exposing process of exposing the insulation photosensitive layer 23 to ultraviolet (UV) is performed using a first photo mask PM1 including a first mask pattern MP1 corresponding to an insulator pattern of the insulators IP.

Here, since the insulation photosensitive layer 23 is the positive type, the area other than the insulators IP corresponding to the first mask pattern MP1 is exposed, and then the exposed area is hardened.

In addition, the exposing conditions of the first exposing process correspond to the light sensitivity of the insulation photosensitive layer 23. In this case, since a low intensity light for a short time is irradiated, the first conductive photosensitive layer 21 and the second conductive photosensitive layer 22 having the light sensitivity lower than that of the insulation photosensitive layer 23 are not hardened.

Next, a first developing process using a developing solution in order to remove the area hardened by the first exposing process is performed.

However, the first conductive photosensitive layer 21 and the second conductive photosensitive layer 22 which are not hardened by the first developing process are not removed.

In addition, the development conditions of the first development process correspond to characteristic (the photosensitive material and the mixture ratio) of the insulation photosensitive layer 23. In this case, an influence on the first conductive photosensitive layer 21 and the second conductive photosensitive layer 22 having the characteristics different from each other may be neglected.

As a result, the insulators IP are formed by performing the patterning only insulation photosensitive layer 23 of the multi-layered film 20 by a photolithography process.

Figure 2D:
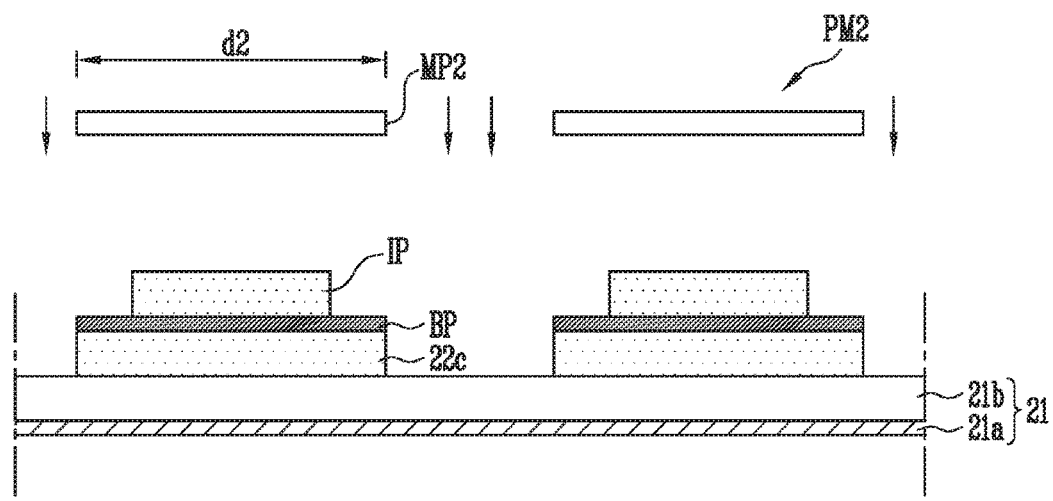

Referring to FIG. 2d, the bridges BP are formed to electrically connect the second sensing electrodes 11b are formed along the second direction D2, while being overlapped with the insulators IP by exposing and developing the second conductive photosensitive layer 22.

More specifically, a second exposing process is performed using a second photo mask PM2 in which a second mask pattern MP2 is formed corresponding to a bridge pattern of the bridges BP.

Here, the bridges BP are overlapped with the insulator IP, but since both end portions thereof are connected to the second sensing electrodes 11b disposed adjacent to each other, the bridges BP should be formed so as to have a length longer than that of the insulator IP.

Accordingly, the length d2 of the second mask pattern MP2 is longer than that of the first mask pattern Mp1. However, a width of both of the mask patterns is substantially the same.

Since the second conductive photosensitive layer 22 is the positive type, the area other than the bridges BP corresponding to the second mask pattern MP2 is exposed, and then the exposed area is hardened.

Since the insulators IP on the bridges BP blocks the light by the second mask pattern MP2, the insulators IP are not hardened together with the bridges BP.

In addition, the exposing conditions of the second exposing process correspond to the light sensitivity of the second conductive photosensitive layer 22. In this case, the first conductive photosensitive layer 21 having the light sensitivity lower than that of the second conductive photosensitive layer 22 is not hardened.

However, the exposing conditions of the second exposing process should be set by considering the slight exposing process performed on the second conductive photosensitive layer 22.

Next, a second developing process using a developing solution in order to remove the area hardened by the second exposing process is performed.

Here, the second conductive photosensitive layer 22 is configured of the second photosensitive film 22a and the second silver nano wire conductive film 22b coated on the second photosensitive film 22a. When the exposed area in the second photosensitive film 22a is removed, the second silver nanowire conductive film 22b is removed, too.

That is, the silver nano wire layer is made of the material that the light is transmitted and has a very fine thickness, such that the metallic nano wire conductive film coated on the photosensitive film is patterned during the process of patterning by the exposing and developing the photosensitive film by the photolithography process.

As a result, photosensitive layer portions 22c remaining by patterning becomes a part of the insulation film IP, and a part of the second silver nano wire conductive film 22b becomes the bridge BP.

Figure 2E:
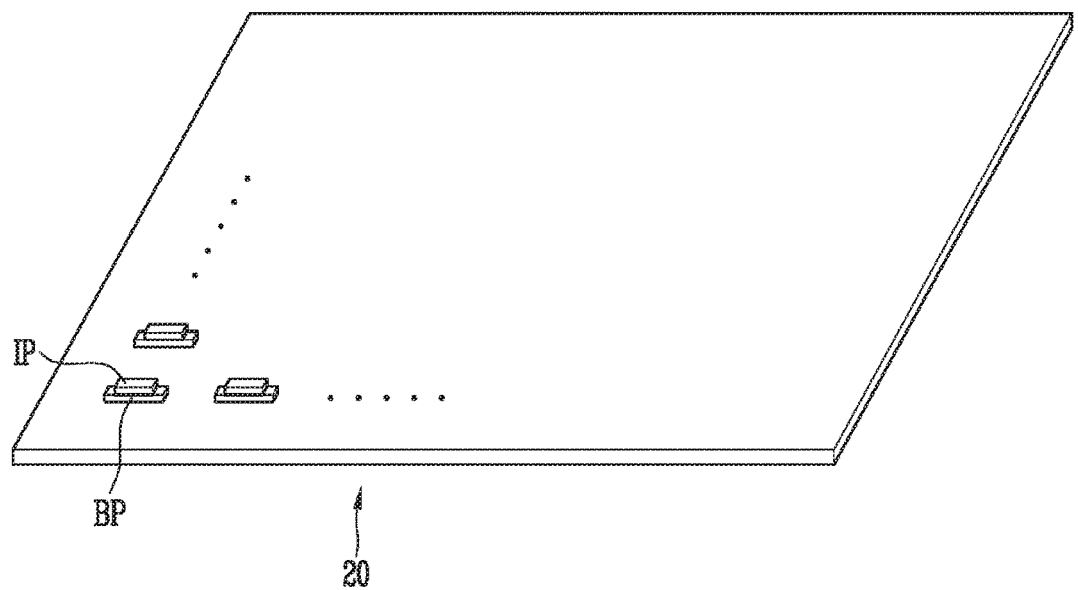

Referring to FIG. 2E, the multi-layered film 20 has a structure in which the bridges BP that the second conductive photosensitive layer 22 is patterned and the insulators IP that the insulation photosensitive layer 23 is patterned are formed in plurality on the entire surface of first conductive photosensitive layer 21 disposed at the bottom after the two patterning processes.

Since the first conductive photosensitive layer 21 needs to be used as ground layer covering the entire surface of the active area AA, it is not separately patterned.

Additionally, a third exposing process may be performed to entirely expose the multi-layered film 20.

The third exposing process hardens all the first conductive photosensitive layer 21, the bridges BP, and insulators IP to stabilize the material and prevent the bridges and the insulators from peeling.

As described above, according to the embodiment of the present invention, the insulator IP and bridges BP are subjected to the exposing and developing processes and patterning on the multi-layered film 20, such that an etching process etching the patterns will be omitted.

Referring to FIGS. 2F and 2G, the multi-layered film 20 in which the insulators IP and bridges BP are formed laminates on the substrate 10 in which the sensing electrodes 11 are formed.

More specifically, the surface in which the bridges and insulators are formed is arranged to face the surface in which the sensing electrodes 11 are formed, and the process of compressing and closely adhering the multi-layered film 20 on the substrate 10 using a heated roller is performed.

Here, an operation of aligning the position of the substrate 10 and the multi-layered film 20 with each other is further performed so that the insulators IP and bridges BP are accurately overlapped with the crossed portion of the first and second sensing electrodes 11a and 11b, that is, the connectors 11c.

As described above, since the bridges BP have a length longer than that of the insulators IP and the silver nano wire conductive film, which is the bridges BP, is disposed under the photosensitive layer portions 22c, the bridge BP closely adhered may provide an electrical interconnecting line to contact to the second sensing electrode 11b.

Since the first photosensitive film 21b and the photosensitive layer portions 22c are made of the insulation material, the first photosensitive film 21b and the photosensitive layer portions 22c serve to insulate between the ground layer GND and the sensing electrodes 11.

The ground layer GND is the first silver nano wire conductive film 21a of the multi-layered film 20 and is electrically connected to a grounding unit (not shown) to maintain a ground potential.

Although the present embodiment describes the fabricating method of the touch screen panel by forming the sensing electrodes 11 on the substrate 10, and forming and patterning the multi-layered film 20, the present invention is not limited thereto. That is, a process order may be changed and an additional process may be added as needed.

FIGS. 3A to 3E are views describing a fabricating method of a touch screen panel according to another embodiment of the present invention.

In the touch screen panel according to another embodiment of the present invention, a first sensing electrode 111 and a second sensing electrode 211 are provided in layer different from each other, and the second sensing electrode 211, the insulation film IL and ground layer GND are formed by patterning a multi-layered film 20.

In addition, the above-mentioned detailed description will be used to the same components as those of the above-mentioned embodiment as long as it is opposite to the concept of the present invention. Therefore, an overlapped description thereof will be omitted.

Figure 3A:
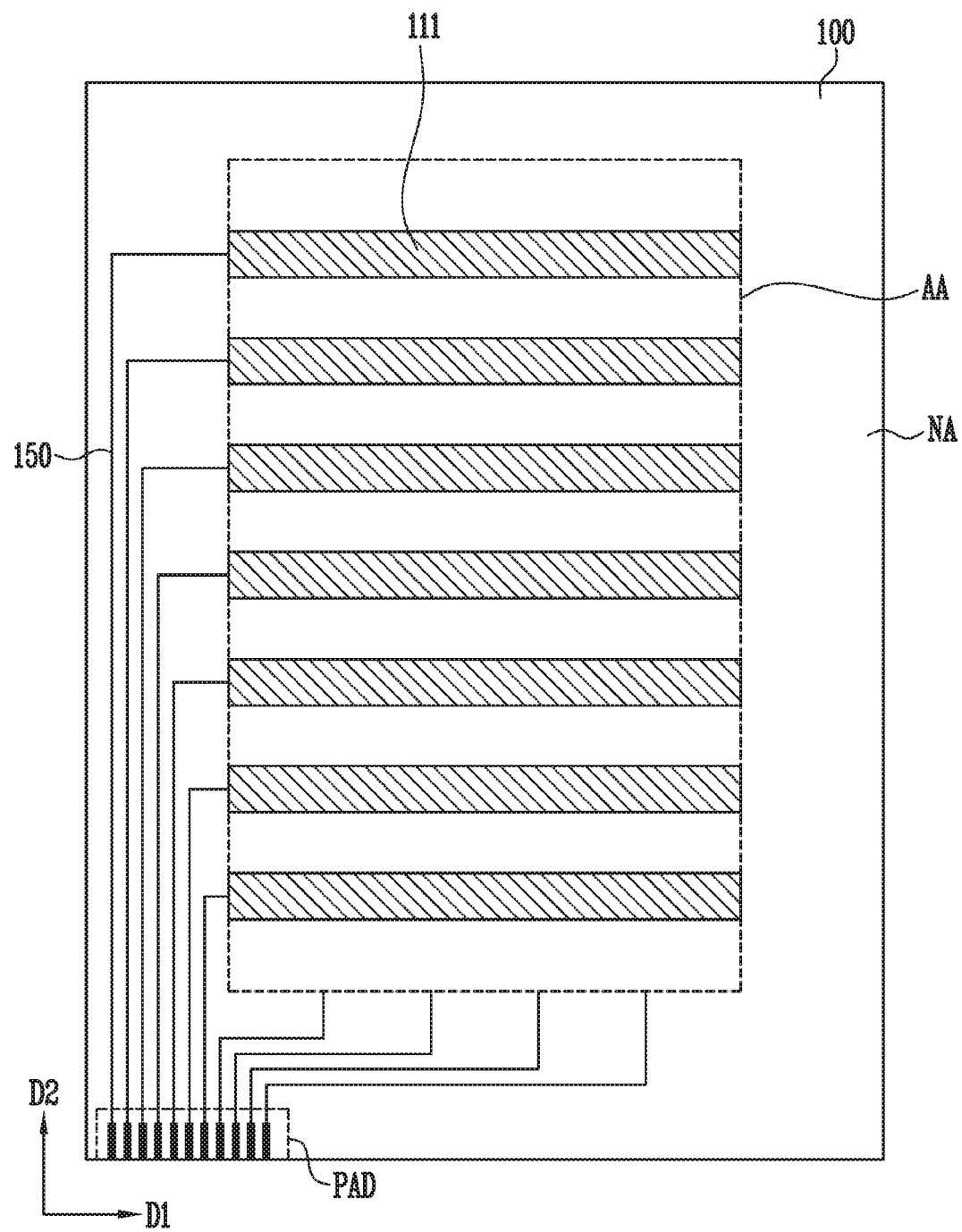
FIGS. 3A to 3E are views describing a fabricating method of a touch screen panel according to another embodiment of the present invention.

Referring to FIG. 3A, the first sensing electrodes 111 which extend along the first direction D1 are formed on the substrate 100.

In addition, outer wirings 150 for connecting each of the first sensing electrodes 111 and the second sensing electrode 211 with an external driving circuit (not shown) may further be formed.

But, the second sensing electrodes 211 which extend along the second direction D2 which intersect the first direction D1 in the completed product and the insulators IP formed between the first sensing electrodes 111 and the second sensing electrodes 211 are not formed during the step illustrated in FIG. 3A.

In the present step in FIG. 3A, only the first sensing electrodes are directly formed on the substrate 100 form, the other configuration to be formed on the first sensing electrodes 111 is formed using the multi-layered film 200 as described below.

As described above, the first sensing electrodes 111 may be formed of a transparent electrode material such as an ITO thereon so that light may be transmitted. Further, the sensing electrodes 11 may be formed by performing the patterning by a photolithography process and an etching process after the conductive material is deposited on the whole surface of the substrate 100.

In addition, in the embodiment of the present invention, the sensing electrodes have a straight stripe pattern. However, the shape of the sensing electrodes may have variously modified exemplary embodiments, and the present invention is not limited thereto.

Figure 3B:
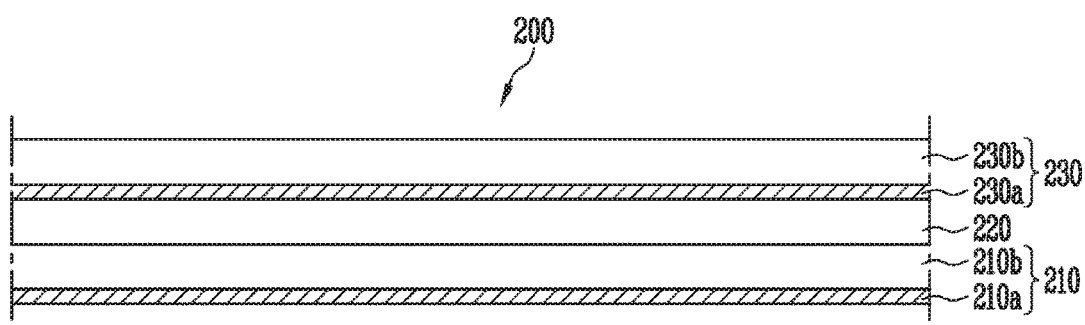

Referring to FIG. 3B, in the multi-layered film 200, a first conductive photosensitive layer 210, an insulation photosensitive layer 220 and a second conductive photosensitive layer 230 having a light sensitivity different from each other are sequentially stacked.

Here, the second conductive photosensitive layer 230 has the light sensitivity higher than that of the insulation photosensitive layer 220, and the insulation photosensitive layer 220 has the light sensitivity higher than that of the first conductive photosensitive layer 210.

In the embodiment of the present invention, it may be defined that the first conductive photosensitive layer 210 has low sensitivity, insulation photosensitive layer 220 has medium sensitivity, and the second conductive photosensitive layer 230 has high sensitivity, for the sake of convenience.

The first and second conductive photosensitivity layers 210 and 230 having the conductivity may have a structure in which the photosensitive film and nanowire conductive film are stacked, respectively. In this case, the insulation photosensitive layer 220 is made of a pure photosensitive material that does not include the conductive material.

When considering thinning effect of the multi-layered film 200, it is preferable that the nano wire conductive film is made of silver nano wire AgNW.

In the partial embodiment, the multi-layered film 200 may have the structure in which a first silver nano wire conductive film 210a, the first photosensitive film 210b, the insulation photosensitive layer 220, a second silver nano wire conductive film 230a, and the second photosensitive film 230b are sequentially stacked.

In this case, the insulation photosensitive layer 220 may be selectively used. Further, the stack structure of the insulation photosensitive layer 220 may have various modified examples as needed within the range including at least two of conductive photosensitive layers.

Figure 3C:
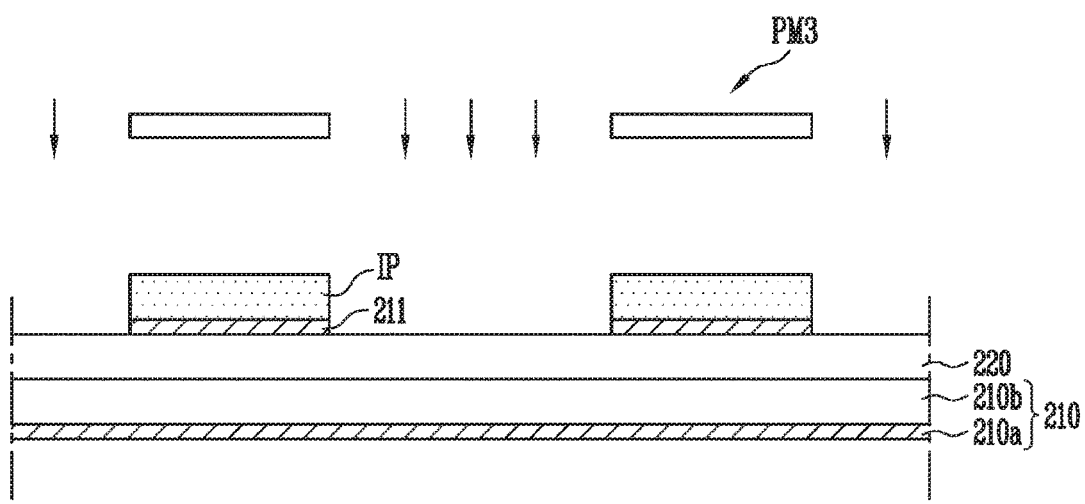
Figure 3D:
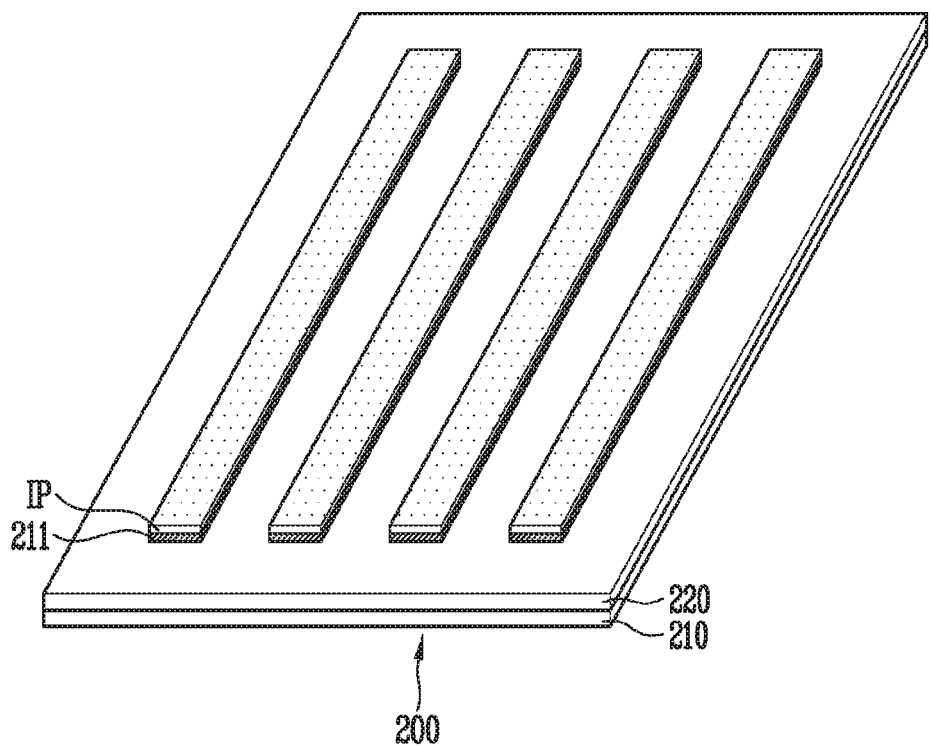

Referring to FIGS. 3C and 3D, the second sensing electrodes 211 which are connected along the second direction D2 intersecting with the first direction D1 and the insulators IP which are disposed between the first sensing electrode 111 and the second sensing electrode 211 to insulate both of the electrodes are formed by exposing and developing the second conductive photosensitive layer 230, which is top layer of the multi-layered film 200.

The second silver nano wire conductive film 230a, which is one layer configuring the second conductive photosensitive layer 230, is patterned into the second sensing electrode 211, and the second photosensitive film 230b, which is the other layer, is patterned into the insulator IP. Since the second sensing electrodes 211 and the insulators IP are patterned using the same mask, they have the same shape and size.

More specifically, an exposing process that the second conductive photosensitive layer 230 is exposed to ultraviolet (UV) is performed using the third photo mask PM3 in which the mask pattern correspond to the second sensing electrode 211 is formed.

Here, since the second conductive photosensitive layer 230 is the positive type, the area other than the second sensing electrodes and the insulators IP corresponding to the mask pattern is exposed, and then the exposed area is hardened.

In addition, the exposing conditions of the exposing process correspond to the light sensitivity of the second conductive photosensitive layer 230. In this case, since a low intensity light for a short time is irradiated, the first conductive photosensitive layer 210 and the insulation photosensitive layer 220 having the light sensitivity lower than that of the second conductive photosensitive layer 230 are not hardened.

Then, a developing process using a developing solution in order to remove the area hardened by the exposing process is performed.

Here, when the exposed area in the second photosensitive film 230b is removed, the second silver nano wire conductive film 230a coated on the lower surface the second photosensitive film 230b is removed.

That is, the silver nano wire layer is made of the material that the light is transmitted and has a very fine thickness, such that the metallic nano wire conductive film coated on the photosensitive film is patterned together during the process of patterning by the exposing and developing the photosensitive film by the photolithography process.

Meanwhile, since the first conductive photosensitive layer 210 needs to be used as ground layer GND covering the whole surface of the active area AA, and the insulation layer 220 needs to be insulated with the first and second sensing electrodes 111 and 211 while entirely covering the ground layer GND, it is not separately patterned.

Additionally, an additional exposing process may be performed to entirely expose the multi-layered film 200.

The additional exposing process hardens all patterns of each layer in the multi-layered film 200 to stabilize the material and prevent a peeling of the patterns.

As described above, according to the embodiment of the present invention, the insulators IP and the second sensing electrodes 211 are subjected to the exposing and developing processes and patterning on the multi-layered film 200, such that an etching process etching the patterns will be omitted.

Figure 3E:
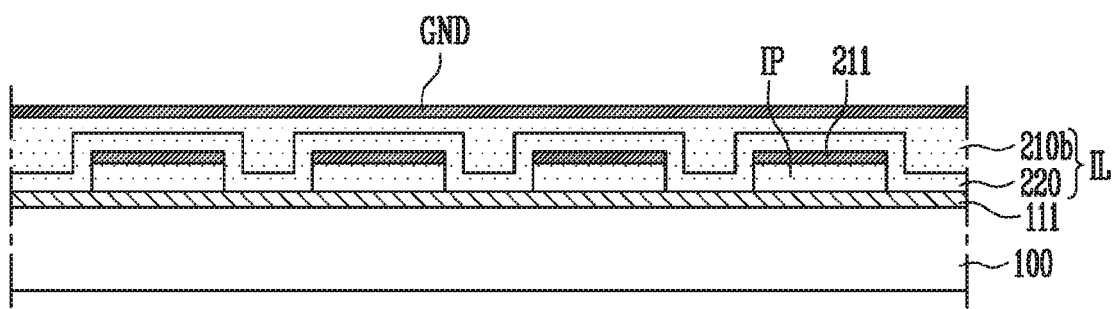

Referring to FIG. 3E, the multi-layered film 200 in which the second sensing electrodes 211 are formed is laminated on the substrate 100 in which the first sensing electrodes 111 are formed.

More specifically, the surface in which the first sensing electrodes 111 are formed is formed to face the surface in which the second sensing electrodes 111 are formed and the process of compressing and closely adhering the multi-layered film 200 on the substrate 100 using a heated roller is performed.

The insulators IP are interposed between the first sensing electrodes 111 and the second sensing electrodes 211 to insulate both of the electrodes, and the insulation photosensitive layer 220 and the first photosensitive film 210b are buried at a space between the second sensing electrodes 211 as one insulation film IL to entirely cover the upper ground layer GND.

The ground layer GND is the first silver nano wire conductive film 210a of the multi-layered film 200 and is electrically connected to a grounding unit (not shown) to maintain a ground potential.

As set forth above, with the touch screen panel and the fabricating method thereof according to the exemplary embodiments of the present invention, the ground layer is formed using the thin film type photosensitive film including the silver nanowire conductive photosensitive layer, thereby making it possible to minimize the increase in the thickness of the product due to the forming of the ground layer.

In addition, the bridges or the sensing electrodes are formed by exposing and developing each layer of the multi-layered film having at least two of the silver nanowire conductive photosensitive layer having the light sensitivity different from each other stacked therein, thereby making it possible to improve the flexible characteristics and simplify a fabricating process of the touch screen panel.

As a result, an aspect of the present invention can provide the touch screen panel and the fabricating method thereof capable of improving the display quality, the flexible characteristics, and the productivity and minimizing the increase in the thickness of the product.

Although the present embodiment describes the fabricating method of the touch screen panel by forming the first sensing electrodes 111 on the substrate 100, and forming and patterning the multi-layered film 200 to form the second sensing electrodes 211, the present invention is not limited thereto. That is, a process order may be changed and an additional process may be added as needed.

While embodiments of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of making a touch screen panel, comprising:
   providing a substrate assembly comprising a substrate, first sensing electrodes formed over the substrate and arranged in rows extending along a first direction, and second sensing electrodes formed over the substrate and arranged in columns extending along a second direction intersecting with the first direction, the first sensing electrodes arranged in each of the rows being connected to each other;
   providing a multi-layered film comprising a first conductive photosensitive layer, a second conductive photosensitive layer, and an insulation photosensitive layer having a light sensitivity different from that of at least one of the first and second conductive photosensitive layers;
   forming insulators by exposing and developing the insulation photosensitive layer;
   forming bridges and insulators by exposing and developing the second conductive photosensitive layer; and
   assembling the substrate assembly and the multi-layered film comprising the insulators and the bridges such that each bridge connects two immediately neighboring second sensing electrodes and each insulator insulates one of the bridges and the first sensing electrodes.

2. The method according to claim 1, wherein the second conductive photosensitive layer has a light sensitivity substantially equal to or higher than that of the first conductive photosensitive layer, and the insulation photosensitive layer has a light sensitivity higher than that of the second conductive photosensitive layer.

3. The method according to claim 2, wherein the first conductive photosensitive layer, the second conductive photosensitive layer, and the insulation photosensitive layer have an amount of exposure and development condition different from each other in the exposure/development processes.

4. The method according to claim 3, wherein each of the first and second conductive photosensitive layers comprises a photosensitive film and a nano wire conductive film.

5. The method according to claim 4, wherein the nano wire conductive film comprises silver nano wires.

6. The method according to claim 5, wherein the multi-layered film comprises a stack of a first silver nano wire conductive film, a first photosensitive film, a second photosensitive film, a second silver nano wire conductive film, and the insulation photosensitive layer which are sequentially stacked.

7. The method according to claim 1, wherein the insulators and the bridges have substantially a same width, and the bridges have a length longer than that of the insulators.

8. The method according to claim 1, further comprising aligning the substrate assembly with the multi layered film so that the insulators and bridges are overlapped with connectors connecting the first sensing electrodes.

9. The method according to claim 1, further comprising exposing the first conductive photosensitive layer.

10. The method according to claim 1, further comprising connecting the first conductive photosensitive layer to a ground unit.

11. The method according to claim 1, wherein the second sensing electrodes are formed over the substrate to be disposed between each of the first sensing electrodes and to be separate from each other.

12. The method according to claim 1, further comprising forming outer wirings over the substrate to connect the first sensing electrodes and the second sensing electrodes to an external driving circuit.

13. The method according to claim 12, wherein the substrate assembly is divided into an active area and a non-active area which is disposed at an outer portion of the active area when viewed in a thickness direction of the substrate, and the first and second sensing electrodes are formed in the active area and the outer wirings are formed in the non-active area.

14. The method according to claim 1, wherein the substrate is made of at least one material selected from the group consisting of polyethylene terephthalate (PET), polycarbonate (PC), acryl, poly methyl methacrylate (PMMA), a triacetylcellulose (TAC) film, polyethersulfone (PES), and a polyimide (PI) film.

* * * * *